(12) United States Patent
Ito

(10) Patent No.: US 8,189,222 B2
(45) Date of Patent: May 29, 2012

(54) DEVICE SYSTEM, SOURCE DEVICE, AND TRANSMISSION METHOD

(75) Inventor: Daisuke Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 12/204,142

(22) Filed: Sep. 4, 2008

(65) Prior Publication Data

US 2009/0066999 A1    Mar. 12, 2009

(30) Foreign Application Priority Data

Sep. 6, 2007  (JP) ................................. 2007-231440

(51) Int. Cl.
- G06F 3/12 (2006.01)
- G06F 15/173 (2006.01)
- G06K 15/00 (2006.01)
- H04N 1/60 (2006.01)
- H04N 1/00 (2006.01)
- G03F 3/08 (2006.01)
- G06Q 10/00 (2006.01)

(52) U.S. Cl. ...... 358/1.15; 358/1.16; 358/1.9; 358/1.13; 358/523; 358/402; 709/223; 709/224; 709/225; 709/226; 705/7.27

(58) Field of Classification Search .................... None
See application file for complete search history.

(56) References Cited

U.S. PATENT DOCUMENTS

| | | | |
|---|---|---|---|
| 6,676,310 B2* | 1/2004 | Simpson et al. | 400/61 |
| 7,692,810 B2* | 4/2010 | Ueda et al. | 358/1.15 |
| 2002/0091559 A1* | 7/2002 | Beniyama et al. | 705/9 |
| 2002/0091560 A1* | 7/2002 | Suzuki et al. | 705/9 |
| 2002/0101608 A1* | 8/2002 | Whitmarsh | 358/1.15 |
| 2003/0086106 A1* | 5/2003 | Parry | 358/1.13 |
| 2006/0012825 A1* | 1/2006 | Kadowaki | 358/1.15 |
| 2006/0026105 A1* | 2/2006 | Endoh | 705/59 |
| 2006/0061823 A1* | 3/2006 | Riesel et al. | 358/1.16 |
| 2006/0087678 A1* | 4/2006 | Simpson | 358/1.15 |
| 2006/0092467 A1* | 5/2006 | Dumitrescu et al. | 358/1.15 |
| 2006/0170962 A1* | 8/2006 | Nakamura | 358/1.15 |
| 2007/0013943 A1* | 1/2007 | Sawayanagi et al. | 358/1.15 |
| 2007/0046958 A1* | 3/2007 | Hoof et al. | 358/1.9 |
| 2007/0279676 A1* | 12/2007 | Garg | 358/1.15 |
| 2008/0130044 A1* | 6/2008 | Yamada | 358/1.15 |
| 2008/0204791 A1* | 8/2008 | Yusa | 358/1.15 |
| 2008/0247004 A1* | 10/2008 | Yeung | 358/486 |
| 2008/0285073 A1* | 11/2008 | Sawayanagi et al. | 358/1.15 |
| 2009/0067008 A1* | 3/2009 | Kodimer et al. | 358/402 |

FOREIGN PATENT DOCUMENTS

| | | |
|---|---|---|
| JP | 4-150340 | 5/1992 |
| JP | 2004-042530 A | 2/2004 |
| JP | 2006-215714 A | 8/2006 |

* cited by examiner

*Primary Examiner* — Hilina S Kassa

(74) *Attorney, Agent, or Firm* — Canon USA Inc IP Division

(57) ABSTRACT

A system includes a transmitting unit configured to transmit an application and data related to the application from a source device to a destination device and a notifying unit configured to notify the source device of the number of times the application has been used in the destination device.

4 Claims, 8 Drawing Sheets

DEVICE SYSTEM, SOURCE DEVICE, AND TRANSMISSION METHOD

BACKGROUND OF THE INVENTION

1. Field of the Invention

The present invention relates to source devices and methods for controlling the source devices.

2. Description of the Related Art

Usage record aggregation servers in general make inquiries to devices that are to use services about records of usage of the services in the devices. Japanese Patent Laid-Open No. H04-150340 discloses such a device. Recently, there has been an increasing number of multifunction devices (service providing devices) having functions of copying, scanning, faxing, etc., which allow other multifunction devices (service receiving devices) to access their functions such as a fax transmission function and a data format conversion function. Hereinafter, software realizing such a function is referred to as a service.

In other words, the service receiving devices that do not have certain services are allowed to utilize the services by the service providing devices.

However, if a service providing device provides services to many service receiving devices, a usage record aggregation server has to collect usage records from many devices, which requires considerable time.

Therefore, it is desirable that records of service usage in service receiving devices be temporarily stored in a service providing device. This allows a usage record aggregation service to collect the service usage records by simply making an inquiry to the service providing device for the records.

SUMMARY OF THE INVENTION

According to an exemplary embodiment, a system includes a source device including a transmission unit that transmits an application and data related to the application to a destination device, a requesting unit that requests a usage record indicating the destination device's use of the application, and a storage unit that aggregates and stores the usage record, and includes a usage record aggregations server that acquires the usage record stored in the source device.

Further features and aspects of the present invention will become apparent from the following description of an exemplary embodiment with reference to the attached drawings.

DESCRIPTION OF THE EMBODIMENTS

In the following, an exemplary embodiment of the present invention will be described with reference to the drawings.

Figure 1:
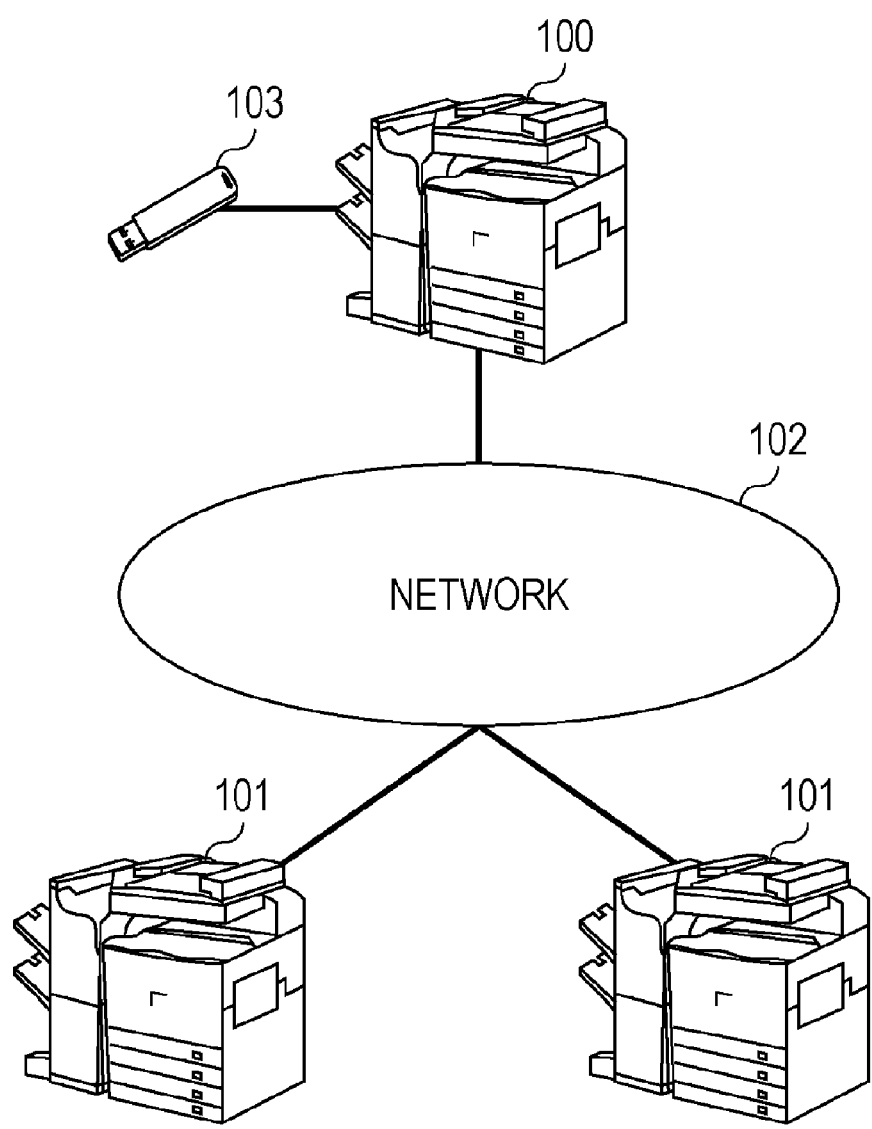
FIG. 1 illustrates a system according to an exemplary embodiment of the present invention.

FIG. 1 illustrates an example of a system according to an exemplary embodiment of the present invention. A service receiving device 100 and service providing devices 101 can communicate with each other via a network 102. The service receiving device 100 is connectable to a portable device 103. The system also includes a usage record aggregation server (not shown). The usage record managing server can communicate with the service providing devices 101 and the service receiving device 100 via the network 102. While the present embodiment only includes two service rendering devices and one service rendering device, any number and combination of these devices that would enable practice of the present embodiment is applicable.

The usage record aggregation server periodically sends, for example, once every predetermined time period, to a service providing device inquiries for usage records (e.g., counter data) stored in the service providing device. Upon receiving the inquiries, the service providing device sends counter data to the usage record aggregation server. In this way, the usage record aggregation server can aggregate the service usage records by making inquiries to the service providing device for its service usage records.

Figure 2:
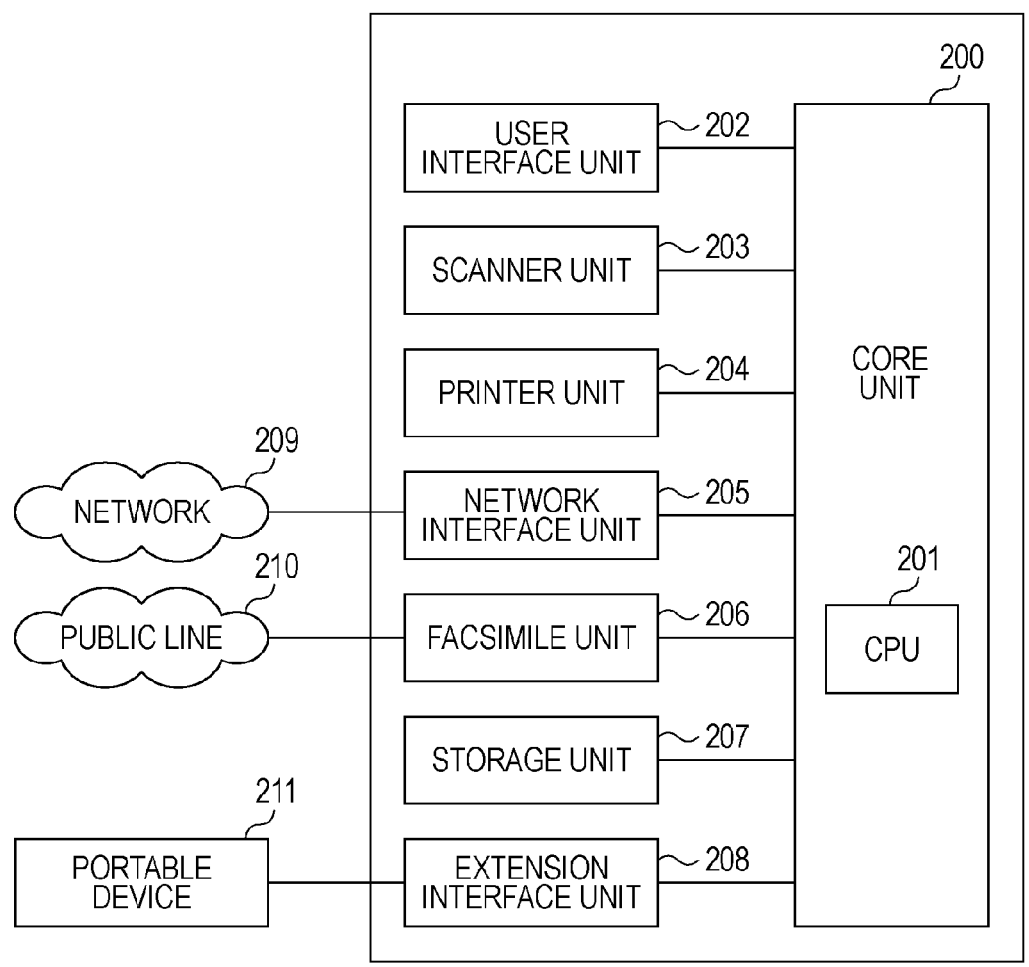
FIG. 2 is a block diagram illustrating an example of a hardware configuration of a device according to an exemplary embodiment of the present invention.

FIG. 2 is a block diagram illustrating a hardware configuration of the service receiving device 100 and the service providing device 101.

As illustrated in FIG. 2, the service receiving device 100 and the service providing device 101 both include a core unit 200 having a CPU (central processing unit) 201, a user interface unit 202, a scanner unit 203, a printer unit 204, a network interface unit 205, a facsimile unit 206, a storage unit 207, and an extension interface unit 208. All of these units are connected to the core unit 200.

The service receiving device 100 and the service providing device 101 are connected to a network 209 through the network interface unit 205 and to a public line 210 through the facsimile unit 206. The service receiving device 100 and the service providing device 101 are capable of communicating with an external device through the network interface unit 205 and the facsimile unit 206.

In addition, the service receiving device 100 and the service providing device 101 can be connected to a portable device 211, such as a USB memory, to send and receive information to and from the portable device 211 through the extension interface unit 208. Note that the service receiving device 100 and the service providing device 101 may be a printing device such as a digital copying machine, a printer with a copying function, a facsimile, or a scanning device. In addition, the portable device 211 is not limited to a USB memory and may be any removable and portable device including a memory.

The core unit 200 controls data, etc., which is transferred between the user interface unit 202, the scanner unit 203, the printer unit 204, the network interface unit 205, the facsimile unit 206, the storage unit 207, and the extension interface unit 208. In addition, the core unit 200 analyzes control data of jobs executed in the device and stores information including the number of copies/prints/scans in the storage unit 207 in order to manage usage status for each user. The user interface unit 202 can display an operation screen for operating the device, an input screen for inputting information, and an error message indicating an error which has occurred. Further, the user interface unit 202 has keys and buttons for operating the device to receive an operation instruction from the user.

Figure 3:
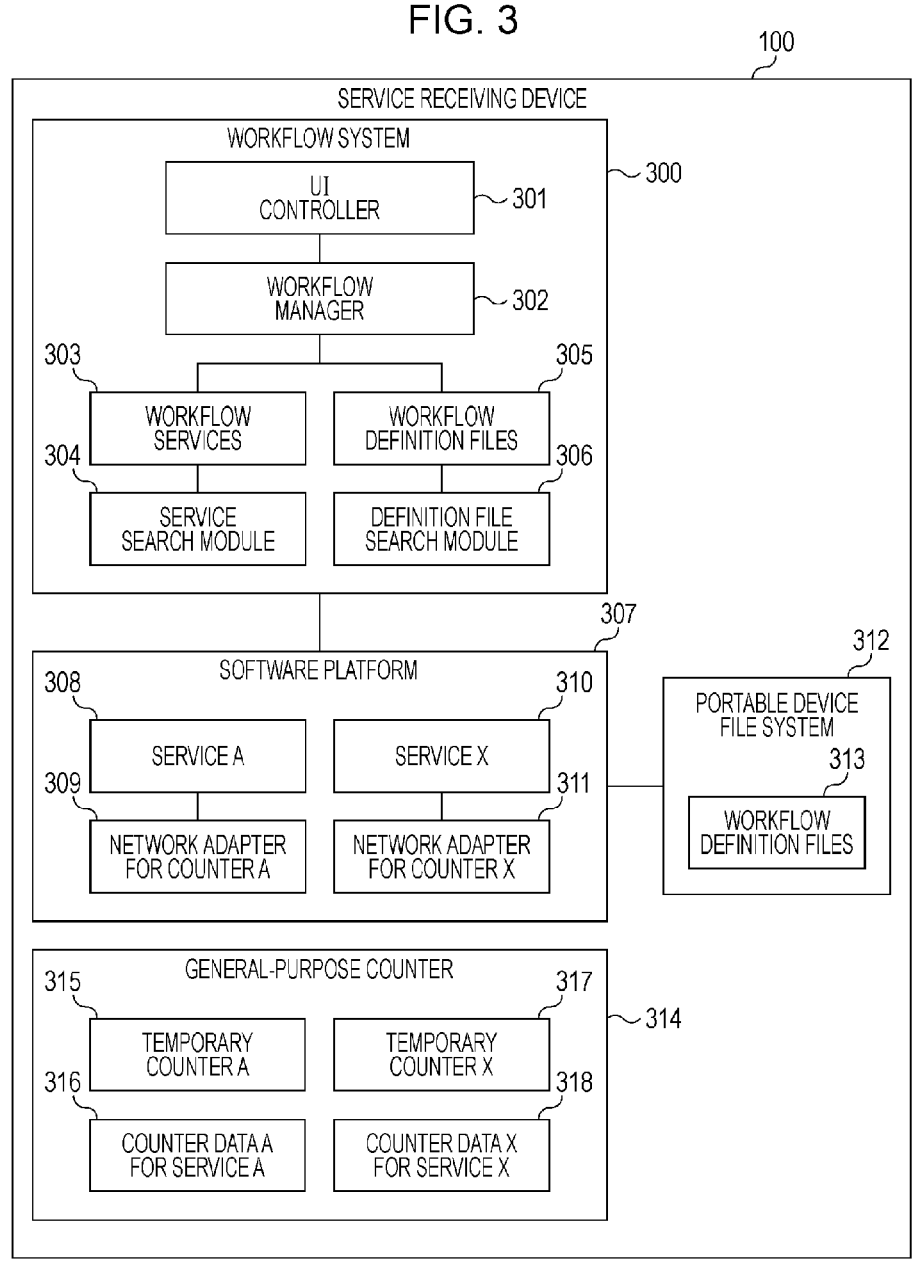
FIG. 3 illustrates an example of software to be executed by a CPU of a service receiving device.

FIG. 3 illustrates an example of software installed in the storage unit 207 of the service receiving device 100 and executed by the CPU 201.

A workflow system 300 is a system for performing a set of data processing tasks in accordance with a predetermined procedure. The set of data processing tasks is hereinafter referred to as a workflow. The workflow system 300 can communicate with a software platform 307.

The software platform 307 can also communicate with a file system in the portable device 211 (portable device file system 312) and a general-purpose counter 314.

The workflow system 300 includes a UI (user interface) controller 301 for controlling a user interface and a workflow manager 302 for managing a workflow. A workflow includes workflow definition files 305, which define workflow procedures, and workflow services 303, which are processes to be performed in accordance with the workflow definitions.

The workflow services 303 and the workflow definition files 305 are searched by a service search module 304 and a definition file search module 306, respectively, from inside and outside of the service receiving device 100.

The software platform 307 includes a group of services which has been searched for and acquired by the service search module 305, including a service A 308 and a service X 310. In the present exemplary embodiment, "X" represents an arbitrary name or value. In addition, the software platform 307 includes network adapters used for sending and receiving information to and from counters corresponding to the services. Such network adapters include a network adapter 309 for a counter A corresponding to the service A and a network adapter 311 for a counter X corresponding to the service X.

The portable device file system 312 includes workflow definition files 313, which are used as the workflow definition files 305, and are searched by the definition file search module 306. The general-purpose counter 314 includes a temporary counter A 315 and a temporary counter X 317, which are used when processing using the network adapter 309 and the network adapter 311 fails.

Figure 6:
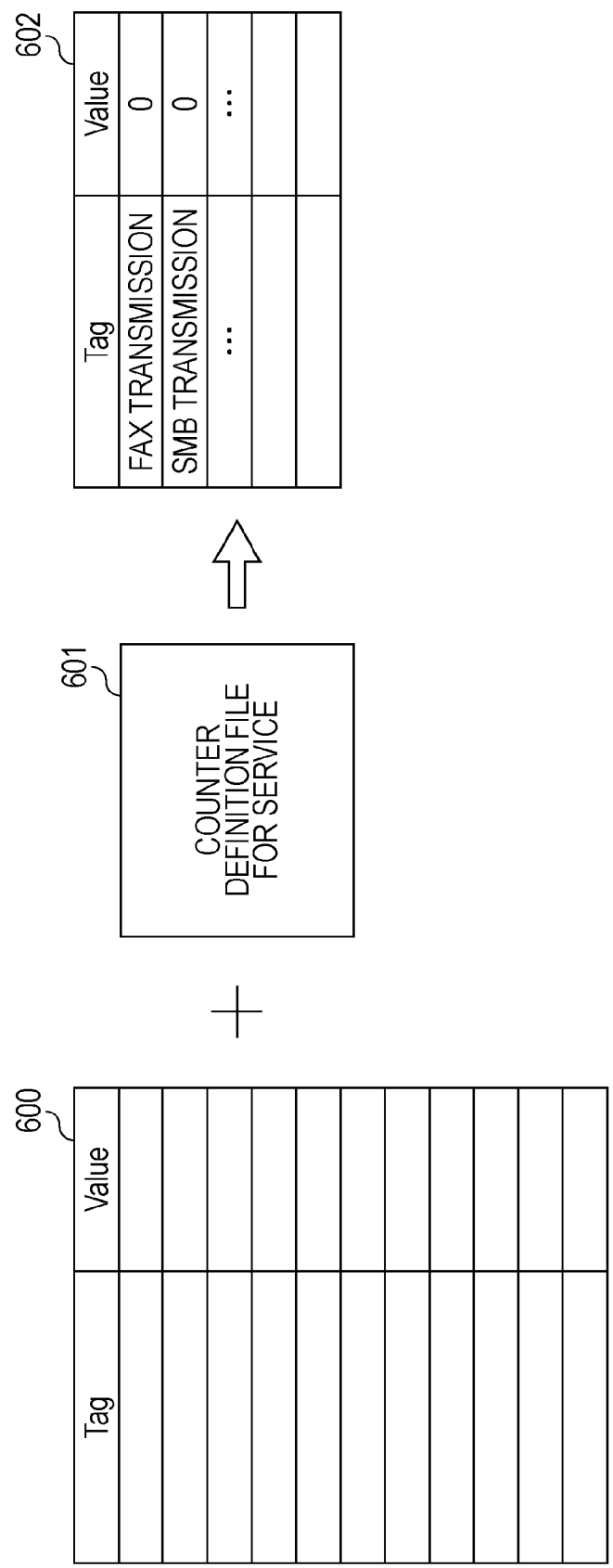
FIG. 6 illustrates an example of application of a general-purpose counter of a service receiving device.

FIG. 6 illustrates an example of a data structure of the general-purpose counter 314, which is designated by reference numeral 600. FIG. 6 also illustrates counter data for a service, such as the service A or the service X, which is designated by reference numeral 601. Counter data for the service A and counter data for the service X are hereinafter referred to as counter data A 316 and counter data X 318, respectively.

The temporary counter A 315 and the temporary counter X 317 can be created by applying the counter data A 316 and the counter data X 318, respectively. The temporary counter A 315 and the temporary counter X 317 are intended for temporary use. An example of a data structure of such a temporary counter is illustrated in FIG. 6 designated by reference numeral 602.

As illustrated in FIG. 6, the temporary counter data A 602 is generated by combining the general-purpose counter data 600 and the corresponding counter data 601. Specifically, names of tags and corresponding values contained in the counter data 601 are incorporated into the data structure of the general-purpose counter data 600, so that the temporary counter A 602 is generated.

Figure 4:
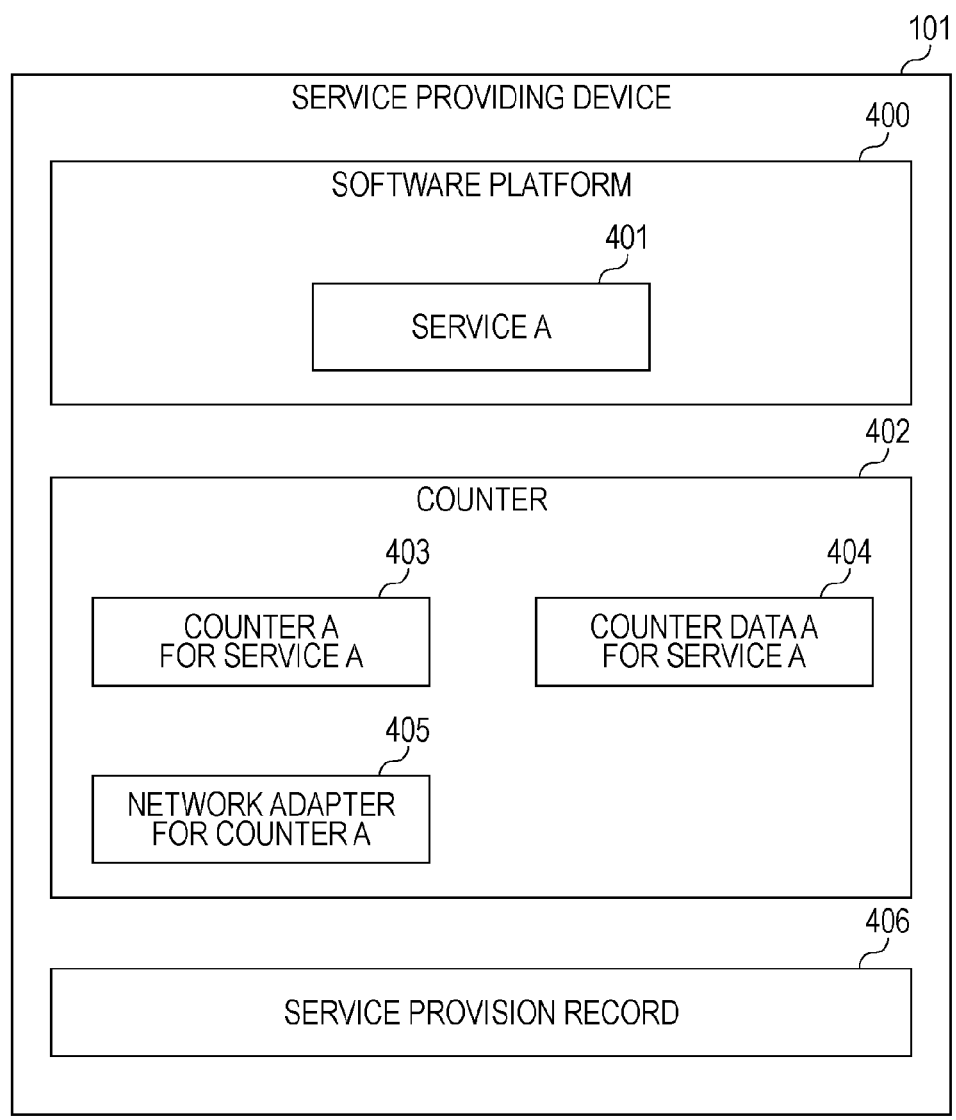
FIG. 4 illustrates an example of software to be executed by a CPU of a service providing device.

FIG. 4 illustrates an example of software which is installed in the storage unit 207 of the service providing device 101 and is executed by the CPU 201. The software to be executed by the CPU 201 includes a software platform 400, a counter 402, and a service provision record 406. The software platform 400 includes the service A 401, for example. The service A can be provided to the service receiving device 100 when it is searched for and obtained by the service receiving device 100. The counter 402 includes counter data A 404 corresponding to the service A and a network adapter 405 for the counter A which are also provided to the service receiving device 100 when the service A 401 is searched for and obtained by the service receiving device 100. The counter A 403 for the service A stores a counter value corresponding to the number of times the service A has been used (number of uses). When the service A 401 is provided to the service receiving device 100, the service provision record 406 of the service A 401 is stored. In the present exemplary embodiment, the counter value represents the number of uses. However, as is apparent to a person skilled in the art, the counter value is not limited to the number of uses. For example, the counter value may indicate a time for which the service A has been used. In any case, the counter value is information indicating a record of usage of the service A.

Figure 7:
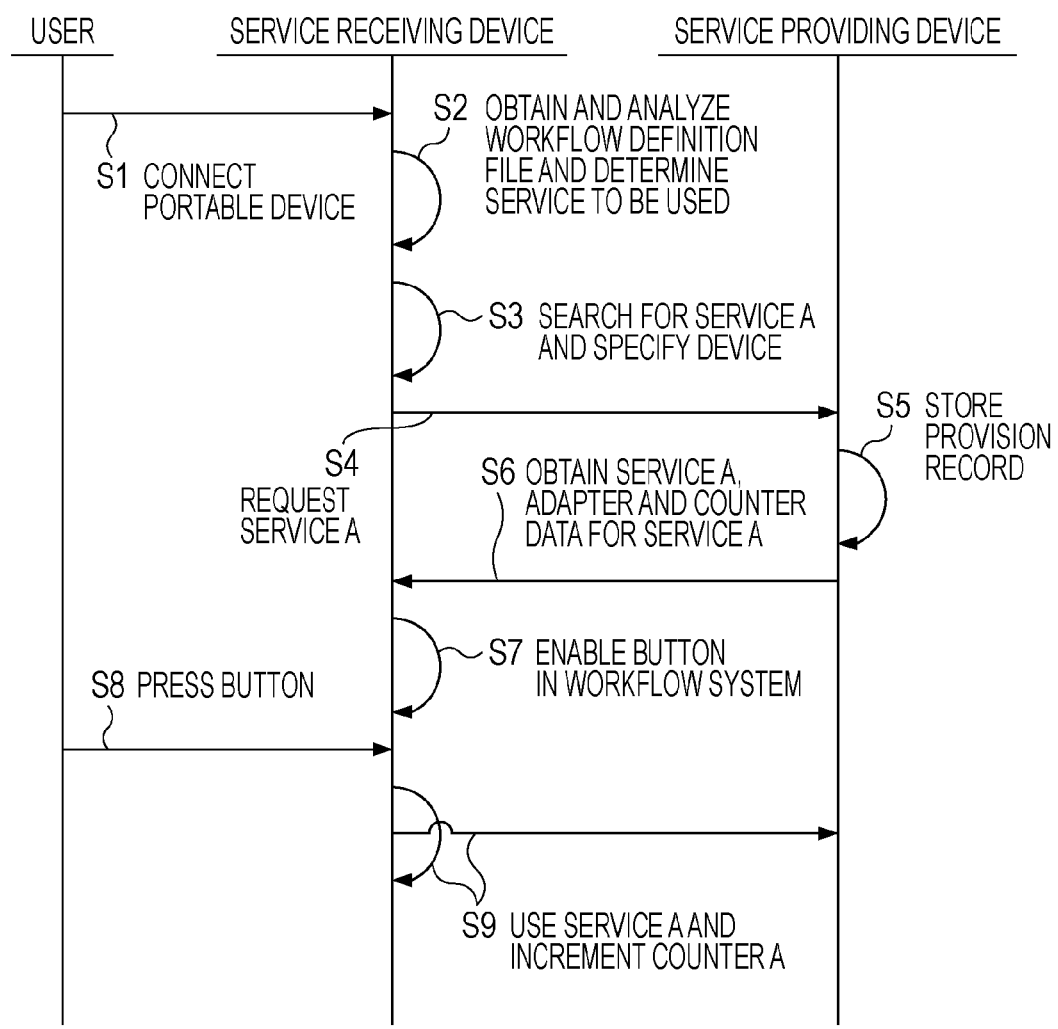
FIG. 7 is a sequence diagram illustrating processing of incrementing a counter for a service.

FIG. 7 is a sequence diagram illustrating an example of a sequence of processing in which the counter A 403 for the service A is incremented.

At Step S1, the sequence starts when the service receiving device 100 detects that the portable device 103 has been connected to the service receiving device 100 by a user.

At Step S2, the service receiving device 100 obtains and analyzes the workflow definition files 313 contained in the portable device 103 and determines a service to be used in a corresponding workflow (the service A 401 in this example).

At Step S3, the service receiving device 100 searches a network for the service A 401 to be used and determines a device having the service A 401 (the service providing device 101 in this example).

Then, at Step S4, the service receiving device 100 requests the service providing device 101 for the service A 401 (for example, a software application).

At Step S5, the service providing device 101 stores a record of provision of the service A 401 in the service provision record 406.

At Step S6, the service receiving device 100 acquires the service A 401, the network adapter 405 for the counter A and the counter data A 404 for the service A.

Figure 5:
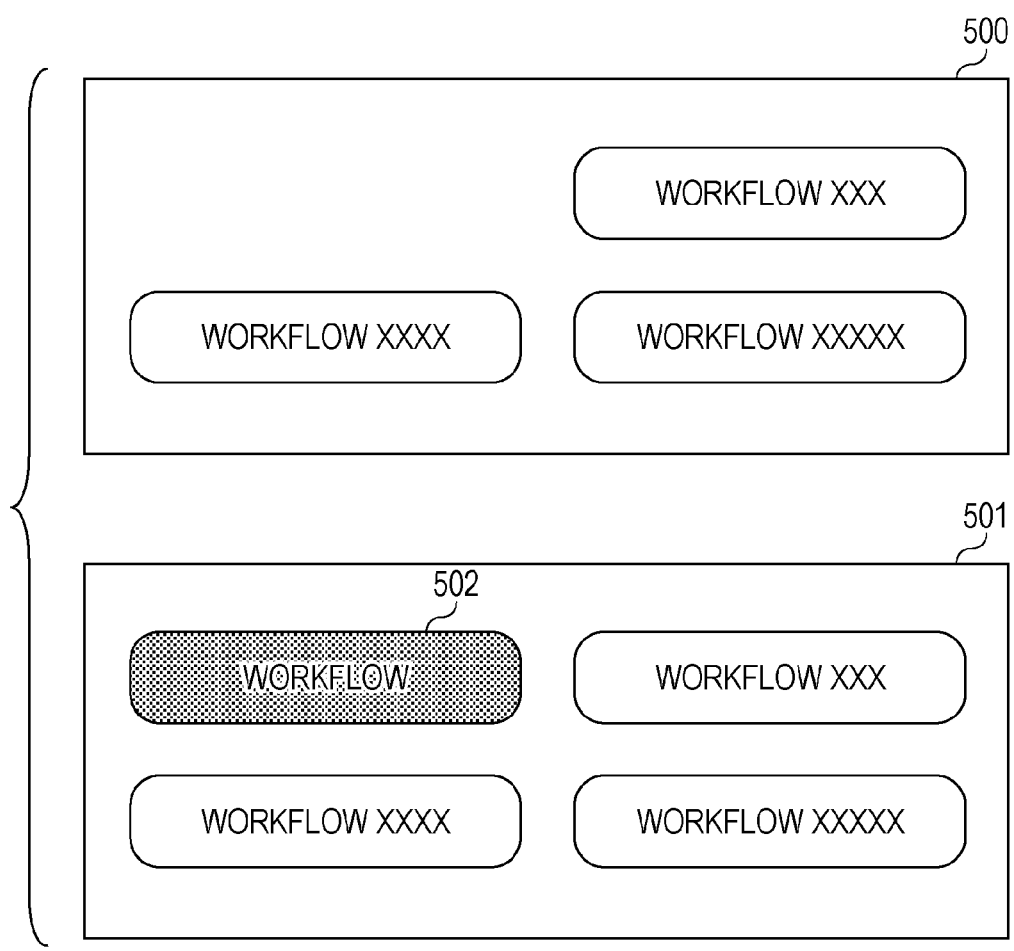
FIG. 5 illustrates an example of a screen displayed in a user interface unit of a service receiving device.

At Step S7, the service receiving device 100, having obtained all services necessary for the desired workflow, enables a button 502 on a user interface 501 displayed by the UI controller 301 in the workflow system 300 (see FIG. 5).

At Step S8, the service receiving device 100 detects that the enabled button 502 (see, FIG. 5) has been pressed by the user.

At Step S9, the service receiving device 100 executes the service A 308 and increments the counter A 403 for the service A of the service providing device 101 through the network adapter 309 for the counter A.

Note that the counter A 403 for the service A is information stored in a storage area in the service providing device 101. In Step S9, the number of uses of the service (1, for example) is added to this information (10, for example) so that the counter A 403 indicates a value of 11. Consequently, the counter A 403 for the service A can be called a usage record of the service A.

In addition, the network adapter is data (application data) allowing a device receiving the service A to transmit a usage record of the service A to a device from which the service A is provided.

Figure 8:
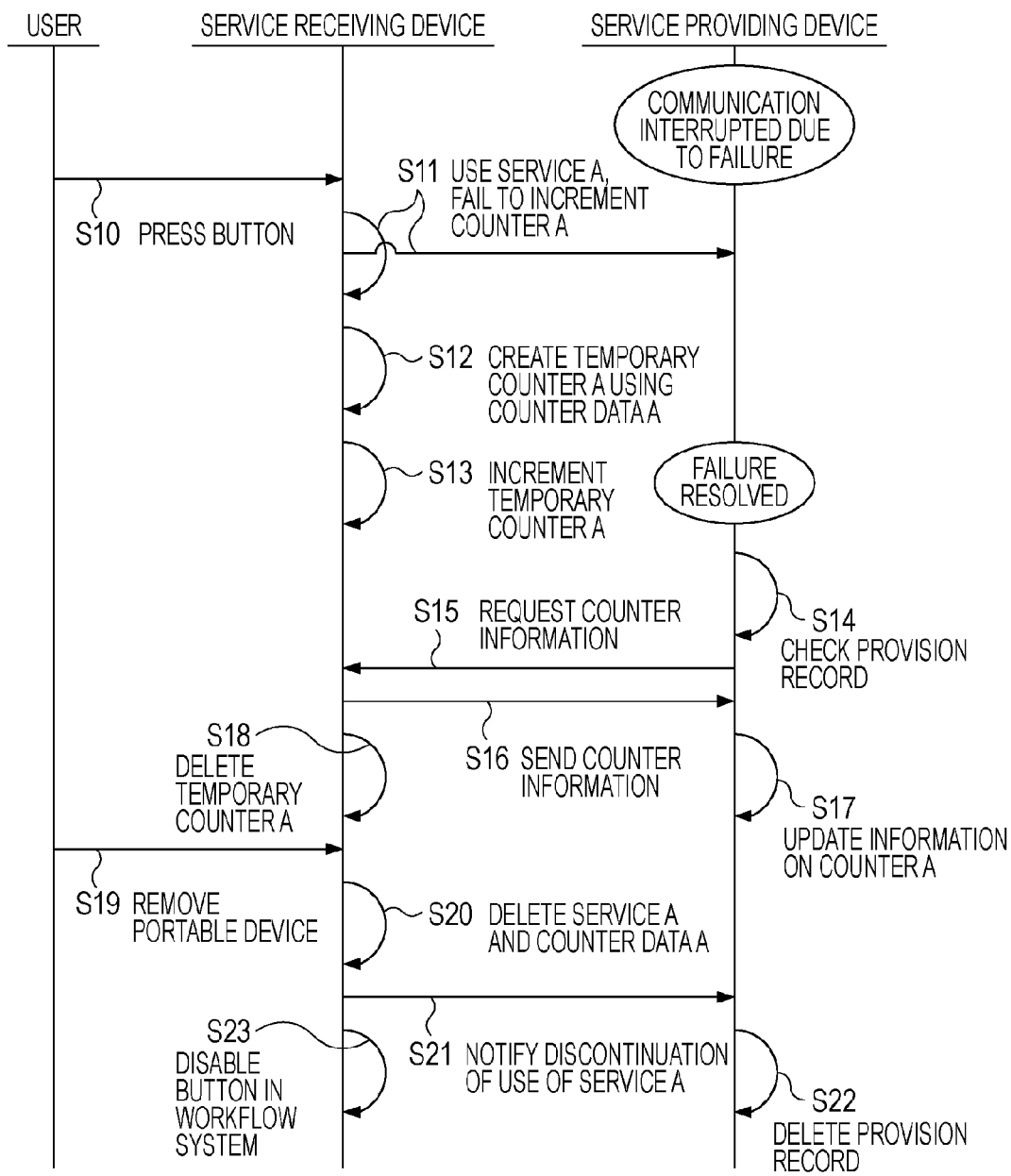
FIG. 8 is a sequence diagram illustrating recovery processing to be performed when processing of incrementing a counter for a service of a service receiving device fails.

FIG. 8 is a sequence diagram illustrating an example of a sequence of recovery processing to be performed when the processing of incrementing the counter A 403 for the service A of the service providing device 101, which is performed after the service receiving device 100 uses the service A 308, has failed.

At Step S10, the service receiving device 100 detects that the enabled button 502 (see FIG. 5) on the user interface 501 of the service receiving device 100 has been pressed by a user.

At Step S11, the service receiving device 100 executes the service A 308 and attempts to increment the counter A 403 for the service A of the service providing device 101 through the network adapter 309 for the counter A. In this example, communication is interrupted due to a failure which has occurred in the service providing device 101 and the processing of incrementing the counter A 403 has failed.

At Step S12, the service receiving device 100 generates the temporary counter A 315 in the general-purpose counter 314 using the counter data A 316 for the service A 308.

Then, at Step S13, the service receiving device 100 increments the temporary counter A 315.

At Step S14, when the failure has been resolved, the service providing device 101 checks the service provision record 406 of the service A 401.

At Step S15, the service providing device 101 requests the service receiving device 100 for the counter information indicating the use of the service A 308, based on the result of the checking of the service provision record 406.

At Step S16, in response to the request, the service receiving device 100 sends the counter information stored in the temporary counter A 315 to the service providing device 101.

At Step S17, based on the received counter information, the service providing device 101 updates the value of the counter A 403.

At Step S18, the service receiving device 100 deletes the temporary counter A 315.

Then, at Step S19, the service receiving device 100 detects that the portable device 103 has been removed from the service receiving device 100 by the user.

At Step S20, the service receiving device 100 deletes the service A 308 and the counter data A 316 for the service A.

At Step S21, the service receiving device 100 notifies the service providing device 101 of the discontinuation of the use of the service A 308.

At Step S22, the service providing device 101 deletes the service provision record 406 of the service A 401.

At Step S23, when all of the services necessary for the workflow have been deleted in the service receiving device 100, the UI controller 301 in the workflow system 300 disables buttons on the user interface 500 (see FIG. 5).

Through the processing described above, the number of times a service has been used in a service receiving device connected to a network can be managed as counter data in a device that provides the service, and a counter value can be recovered when a communication failure, etc., occurs.

In the present exemplary embodiment, an example of a system in which a counter value is recovered has been described. However, data to be recovered is not limited to a counter value. Specifically, the present exemplary embodiment may be applied to recovery processing of any data relating to applications transferred between a source device and a destination device.

It should be understood that the present invention is also achieved by supplying a computer-readable storage medium storing software program code for realizing the functions of the above-described embodiments to a system or apparatus. The program code stored in the storage medium is read out and executed by a computer (CPU or MPU) of the system or apparatus.

In this case, the program code read out from the storage medium realizes the functions of the embodiments, and thus the storage medium storing the program code may be encompassed in the present invention.

Examples of the storage media for supplying the program code include, for example, floppy disks, hard disks, optical disks, magneto-optical disks (MO), CD-ROMs (compact disk-read-only memories), CD-Rs (CD-recordables), magnetic tapes, non-volatile memory cards, and ROMs (read-only memories).

The functions of the above-described embodiments may be realized when the computer executes the readout program code. Further, the functions of the above-described embodiments may be realized when an OS or the like running on the computer performs some or all of actual processes on the basis of the instructions of the program.

Further, the functions of the above-described embodiments may also be realized when the program code read out from the storage medium is written to the memory of a function expansion board inserted into the computer or the memory of a function expansion unit connected to the computer, and then the CPU of the function expansion board or function expansion unit performs part or all of actual processes based on the instructions of the program code.

A number of currently available multifunction devices capable of copying, scanning, faxing, etc., are configured to allow other multifunction devices to use their functions such as a fax transmission function and a data format conversion function.

Utilizing such a configuration, the number of times a service has been used by various devices may be aggregated as counter data in a device that provides the service, so that the amount of a charge for the service is determined on the basis of the counter data.

Thus, it is necessary to aggregate the number of times the service has been used as counter data and to accurately calculate a counter value to be reflected on a charge amount. To this end, there is a need for a technique for recovering a counter value in case a communication failure, etc., occurs while the service is used.

In currently available techniques for performing data recovery processing when communication with an account data processing device fails, in general, account data is temporarily stored (see for example, Japanese Patent Laid-Open No. H04-150340).

However, none of such techniques are seen to provide a device system in which the number of times a service has been used by a group of device connected over a network is aggregated as counter data in a device providing the service.

By using the technique according to the exemplary embodiment described above, a counter value can be recovered when a communication failure or the like occurs, which increases the accuracy of counter data and the precision of accounting processing.

While the present invention has been described with reference to exemplary embodiments, it is to be understood that the invention is not limited to the disclosed exemplary embodiment. The scope of the following claims is to be accorded the broadest interpretation so as to encompass all modifications, equivalent structures and functions.

This application claims the benefit of Japanese Application No. 2007-231440 filed Sep. 6, 2007, which is hereby incorporated by reference herein in its entirety.

What is claimed is:

1. A device system comprising:
one or more source devices; and
a destination device, the destination device including:
a connection detecting unit configured to detect connection of a portable device;

an application determining unit configured to determine an application to be used for executing a workflow by analyzing a workflow definition file contained in the portable device;

a source device determining unit configured to search a network for the determined application and determine a source device having the determined application; and an application requesting unit configured to request the determined source device for the determination application, the source device including:

a transmission unit configured to transmit the application and data related to the application to the destination device in response to the request from the destination device;

a recording unit configured to record a provision record of the transmitted application; and a storage unit configured to store a number of times the application is executed in the destination device, the destination device further including:

an enabling unit configured to enable a button for instructing to execute the workflow after the destination device receives the transmitted application and data;

a button-press detecting unit configured to detect that the enabled button is pressed by a user; and an increment requesting unit configure to execute the application in response to the detection that the button is pressed and to request the determined source device to increment the number of times the application is executed, the source device further including:

an increment unit configured to increment the number of times in response to the increment request from the destination device;

a requesting unit configured to check the provision record and request the destination device, the provision record for which still remains, for counter information including the number of times the application is executed to be recorded by the destination device, in a case where a failure occurs and is resolved in the source device; and an updating unit configured to increment and update the number of times, using the counter information notified from the destination device in response to the request for the counter information, and the destination device further including:

a request unit configured to request the source device to increment the number of times the application is executed obtained from the source device;

a generation unit configured to generate a temporary counter for recording counter information based on the data related to the application, in a case where the increment request fails;

a creating unit configured to create counter information by incrementing the number of times the application is executed after the increment request fails, using the temporary counter; and a notification unit configured to notify the created counter information in response to the request for the counter information from the source device.

2. The device system according to claim 1, wherein the destination device further includes a transmission unit configured to transmit, to the source device, a notification indicating that the execution of the application is finished, in a case where the execution of the application is finished, and wherein the source device further includes a deleting unit configured to delete the provision record related to the destination device based on the notification indicating that the execution of the application is finished transmitted from the destination device.

3. A method for controlling a system, the method comprising:

providing one or more source devices; and providing a destination device performs the following functions:

detecting connection of a portable device via a connection detecting unit;

determining an application to be used for executing a workflow by analyzing a workflow definition file contained in the portable device via an application determining unit;

searching a network for the determined application and determine a source device having the determined application via a source device determining unit; and requesting the determined source device for the determination application via an application requesting unit, and wherein the source device performs the following functions:

transmitting the application and data related to the application to the destination device in response to the request from the destination device via a transmission unit;

recording a provision record of the transmitted application via a recording unit; and storing a number of times the application is executed in the destination device via a storage unit;

the destination device further performs the following functions:

enabling a button for instructing to execute the workflow via an enabling unit after the destination device receives the transmitted application and data;

detecting that the enabled button is pressed by a user via a button-press detecting unit; and executing the application in response to the detection that the button is pressed and to request the determined source device to increment the number of times the application is executed via an increment requesting unit, the source device further performs the following functions:

incrementing the number of times in response to the increment request from the destination device via an increment unit;

checking the provision record and request the destination device, the provision record for which still remains, for counter information including the number of times the application is executed to be recorded by the destination device, in a case where a failure occurs and is resolved in the source device, via a requesting unit; and incrementing and updating the number of times, using the counter information notified from the destination device in response to the request for the counter information via an updating unit, and wherein the destination device further performs the following functions:

requesting the source device to increment the number of times the application is executed obtained from the source device via a request unit;

generating a temporary counter for recording counter information based on the data related to the application, in a case where the increment request fails, via a generation unit;

creating counter information by incrementing the number of times the application is executed after the increment request fails, using the temporary counter via a creating unit; and notifying the created counter information in response to the request for the counter information from the source device via a notification unit.

4. The method according to claim 3, transmitting to the source device a notification indicating that the execution of the application is finished, in a case where the execution of the application is finished, via a transmission unit of the destination device, and wherein the source device further includes a deleting unit configured to delete the provision record related to the destination device based on the notification indicating that the execution of the application is finished transmitted from the destination device.

* * * * *